United States Patent

[11] 3,624,342

| [72] | Inventor | Herbert J. Hoffman<br>Torrance, Calif. |
|------|----------|------------------------------|
| [21] | Appl. No. | 684,126 |
| [22] | Filed | Nov. 20, 1967 |
| [45] | Patented | Nov. 30, 1971 |
| [73] | Assignee | TRW Inc.<br>Redondo Beach, Calif. |

[54] METHOD OF MAKING A FLEXURAL DIAPHRAGM SEAL
7 Claims, 4 Drawing Figs.

[52] U.S. Cl. .................................................. 219/121 EM,
277/205, 60/258, 29/454
[51] Int. Cl. .................................................. B23k 9/00
[50] Field of Search .......................................... 60/258;
277/205; 219/121; 29/454, 455, 157

[56] References Cited
UNITED STATES PATENTS

| 3,222,496 | 12/1965 | Windebank | 219/121 |
| 3,326,091 | 6/1967 | Allen | 92/34 |
| 3,391,533 | 7/1968 | Mageean | 60/39.27 |

Primary Examiner—J. V. Truhe
Assistant Examiner—Gale R. Peterson
Attorneys—Daniel T. Anderson, Donald R. Nyhagen and Gerald Singer ABSTRACT: A device, such as a rocket engine fuel injector, having two coaxial parts joined by an intervening annular flexure which provides a fluid seal between the parts and/or supports the parts for relative axial movement is fabricated by positioning an annular flexible diaphragm with radially inner and outer flanges between a pair of coaxial members having confronting annular axially presented surfaces seating against opposite sides of the flanges, joining the contacting flanges and surfaces, and severing each member into two totally separate radially inner and outer portions along annular parting lines located between the joined inner and outer flanges and surfaces to provide a finished device wherein the severed portions of the members and the diaphragm constitute the parts and flexure of the device.

PATENTED NOV 30 1971

Herbert J. Hoffman,
INVENTOR
BY

ATTORNEY.

Herbert J. Hoffman,
INVENTOR 3,624,342

1

METHOD OF MAKING A FLEXURAL DIAPHRAGM SEAL

BACKGROUND OF THE INVENTION

A variety of devices embody two concentric or coaxial parts which are required to be sealed against fluid leakage between the parts and/or move freely relative to one another in the axial direction. One such device, for example, is a rocket engine fuel injector with a movable injector sleeve. These injectors have been incorporated in variable thrust rocket engines to maintain a constant injection velocity over a wide thrust range. In the past, the injector sleeves have been supported on the injector pintle with sliding bearings and sealed with O-rings. Bellows also have been used as seals and as flexural bearings to permit axial movement and to provide lateral support. The O-rings and sliding bearings have the disadvantages of high friction, danger of seizing and galling and high probability of leakage, and bellows have a high cost and low-volumetric spring rate for fluctuations in propellant pressure. The low volumetric spring rate causes increased instability in the function of the injector. The described supporting and sealing arrangements have similar disadvantages in other devices of the class described, wherein the parts must be sealed against fluid leakage between the parts and/or move freely relative to one another in the axial direction.

One method of overcoming the above disadvantage of the described sealing and supporting arrangements involves the use of an annular flexure, such as a semitoroidal diaphragm, to seal and/or support the parts for relative axial movement. This flexure is joined about its radially inner and outer edges to the parts and flexes to permit relative axial movement of the parts. The flexure may also provide a fluid seal between the parts.

The present invention provides a novel method of fabricating a device of the class described wherein the parts are sealed and/or supported for relative axial movement by an annular flexure in the form of an annular flexible diaphragm. According to the method, two members are provided with shape corresponding to those of the parts of the finished device and with annular radially inner and outer surfaces concentric about and facing axially of axes of the members. The corresponding surfaces on the two members have the same diameter and are so situated on the members that the later can be placed in a coaxial or concentric relation corresponding to the relation of the parts of the finished device wherein the corresponding surfaces confront one another. Also provided is an annular flexure in the form of an annular flexible diaphragm, such as a semitoroidal diaphragm, with radially inner and outer flange of the same diameters as the member surfaces.

In the first step of the method, the diaphragm is placed between the members in a position where the member surfaces seat against opposite sides of the diaphragm flanges. The contacting flanges and surfaces are then joined, as by electron beam welding. Finally, each member is severed into two totally separate portions along annular parting lines located between the joined flanges and surfaces to provide a device having two concentric or coaxial parts which are formed by the severed portions of the members and are sealed against fluid leakage between the parts and/or supported for relative axial movement by the annular diaphragm.

According to the preferred practice of the method, the members are provided with slidably interfitting formations which positively retain the members in concentric or coaxial relation during joining of the members and diaphragm and subsequent severing of the members. These interfitting formations may then be removed. An axial clamping force may be applied to the members during the joining and severing steps to retain the members in firm contact with the diaphragm flanges and in fixed relation to one another.

BRIEF DESCRIPTION OF THE DRAWINGS

Referring to the accompanying drawings, which are for illustrative purposes.

DESCRIPTION OF THE PREFERRED EMBODIMENT

Figure 1:
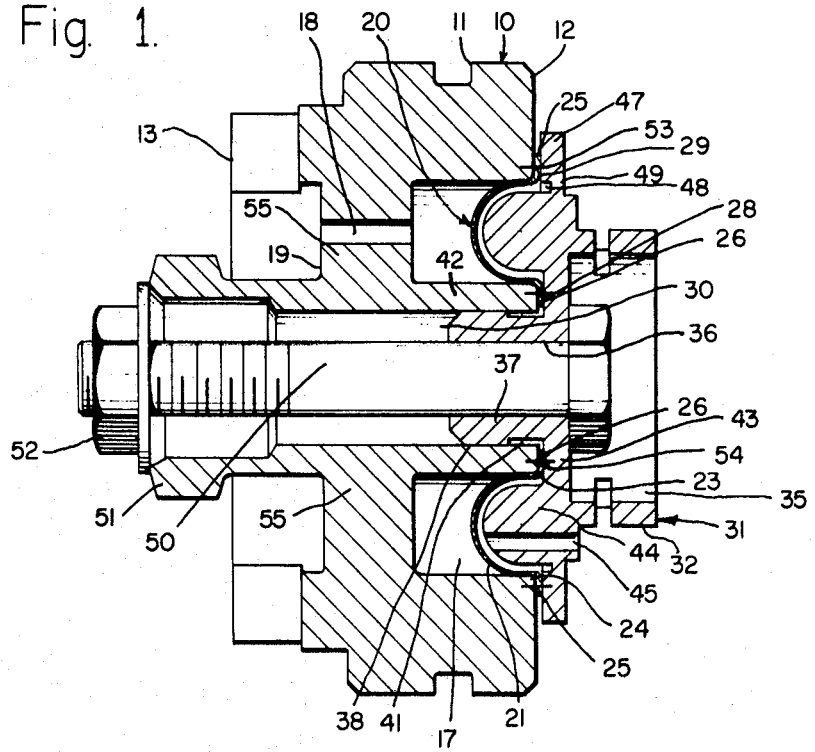
FIG. 1 is a cross-sectional view illustrating an intermediate state in the present method of fabricating a device with relatively movable parts.

Referring again to the drawings, there is shown in FIG. 1 a generally cylindrical member 10 having a cylindrical surface at 11 and having a flat top face 12, and flat bottom face portions at 13. Cut into the top face 12 is an annular groove 17 having a bore 18 to communicate the groove with an underside of the member 10 at 19.

Concentrically fitted within the groove 17 is a semitoroid sealing member generally designated as 20. The semitoroid portion 21 of the seal terminates at outer edges as at 23 and 24 at the top face 12. Extending radially from the semitoroidal portion 21 are an outer annular flange 25 and an inner annular flange 26. The semitoroidal seal 20 is in the form of a diaphragm membrane having a thickness of from 0.002 inch to 0.003 inch and is made from 17-7 PH CRES and when the seal is formed from the thin metal into the shape of a semitoroid, it is permissible to thin the metal in the amount of 0.005 inch. The radius of the toroidal curve as indicated in cross section as 21 is that of a full semicircle having its center on a line which would extend from the top surfaces as 28 and 29 of the respective flanges.

The semitoroid 20 and the groove 17 mate and when the seal is slipped into the groove it is concentrically positioned with respect to the member 10, its outer surface 11 and a centrally positioned, generally cylindrical bore 30 extending through the member 10. In order to hold the flanges of the seal in abutment with the top surface 12, a spacing member, generally designated as 31, is fitted over the seal and into the bore 30.

The member 31 has a generally cylindrical wall 32 surrounding a recess 35, the configuration of which is dependent upon its future use and not upon its use as a means to secure the seal in position. From the recess 35 extends a central cylindrical bore 36, surrounded by a generally cylindrical wall 37 having an outer cylindrical surface 38 fitted with the surface of the bore 30 so as to position the member 31 concentrically within the member 10. Axially outwardly of the surface 38, there is cut into the wall 37 an annular groove 41, providing a space between a wall 42 of the bore 30. The inner surface of the flange 26 is in abutment with the top face of the wall 42 and is spaced radially outwardly from the bore 30 so that there is transverse space between the flange 26 and the groove 41.

Extending radially outwardly of the wall 37 is a transverse wall portion 43 on which is formed a convex semitoroid spacing portion 44, extending into the concavity of the seal 20. The configuration of the semitoroid 44 is provided for a specific use, namely that of substantially filling the cavity in the seal and which use is not directly related to the present invention. External communication is provided to the seal through the member 44 by a conduit 45. Radially outwardly of the spacing portion 44 is an annular flange 47 in transverse alignment with the wall 43 and is positioned to abut the outer flange 25 of the seal. Outwardly of the spacing portion 44 is an annular groove 48 and outwardly of the groove is an annular connecting portion 49.

The member 31 is secured to the member 10 by means of a bolt 50, having a nut 52 and washer thereon, tightened against a boss 51 at the bottom portion of the member 10. After the member 31 is secured to the member 10, the flange 47, the seal flange 25 and the top face of the member 10 thereunder are electron beam welded together at 53. Similarly, the wall 43, the flange 26 and the top surface of the wall 42 are electron beam welded together at 54. These welds provide continuous annular seals in the areas around the paths of the welds so as to form a seal, for example, between the convex side of the semitoroid 20 within the groove 17 and its concave side and the undersurface of the spacer portion 44 and the flanges extending from it.

Figure 2:
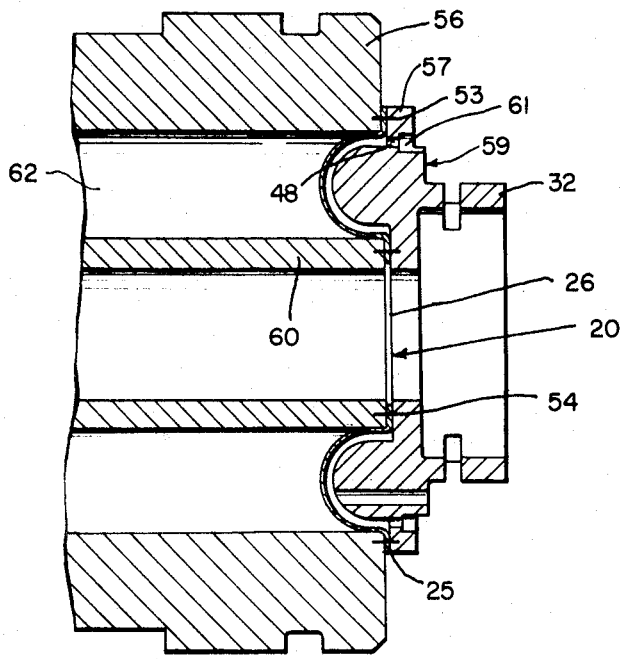
FIG. 2 is an enlarged cross-sectional view of the finished device.

The conduits 18 and 45 provide means for pretesting the seal 20 after it is welded and while the members 10 and 31 are held together by the bolt 50. In addition to the precut groove 48 and 41, the axial portion of the member 10 on both sides of the area 55, including the conduit 18, have been precut so that the integral members 10 and 31 can be easily machined to provide two axial members supported by the seal 20. This is illustrated in FIG. 2, where the radially outer member is comprised of a cylindrical portion 56 and an annular ring 57. The inner portion is comprised of what remains of the member 31, designated as 59, and includes what remains of the wall portion 42 and the boss 51. This portion is now in the form of a sleeve 60.

Thus, to sever the spacer 31 from its flange 47, an annular groove 61 is cut in alignment with the annular groove 48. As shown in FIG. 2, the outer portion of the flange 47 have also been machined off. Similarly, the portion 55 has been removed so as to provide an open space 62 for the full length of the cylindrical portion 56 and the sleeve 60. After the bolt has been removed, or even before, if the head is small enough, an annular cut is made in alignment with the groove 41 to sever the aligning wall 37 from the remainder of the member 31 to complete the member 59. Thus, it is apparent that the precut groove 41 and 48, as well as the cutaway portions on both sides of the body portion 55 in FIG. 1, provide precut tooling and mating parts to eliminate the need for auxiliary tooling and/or jigs. This arrangement prevents any misalignment of the sleeve 60 with respect to the cylindrical portion 56.

In operation, any pressure differential between the outer parts 56 and the inner parts 59 and 60 is resisted by the diaphragm 20 in pure tension while axial deflection is allowed by the rolling of the diaphragm. This results in the capacity of resisting comparatively high pressures while flexing at a very low spring rate. The radial spring rate is extremely high, which is exactly the characteristic desired for the accurate guiding of the sleeve 60, while providing very rigid lateral support. Such diaphragms have been used in rocket propellant fuel injectors in which the diaphragm at the point 23 and 24 had an inside diameter of one inch and at similar points at an outside diameter of approximately 1½ inches. The inside diameter of the inner flange was approximately 1/2 inch and the external diameter of the outer flange was approximately 1.687 inches. The toroidal radius of the curve 20 was 0.125 inches. The corrosion resistant steel used had spring rates of approximately 400 lbs. per inch and when combined in series, the semitoroidal diaphragms produced spring rates equal to the sum of the number of springs used. Because of the toroidal shape, the diaphragm withstands high internal pressures such as 2,000 lbs. per square inch while exhibiting extremely high spring rates. The pressure differential in a rocket propellent and oxidizer injector was approximately 700 p.s.i.

Figure 3:
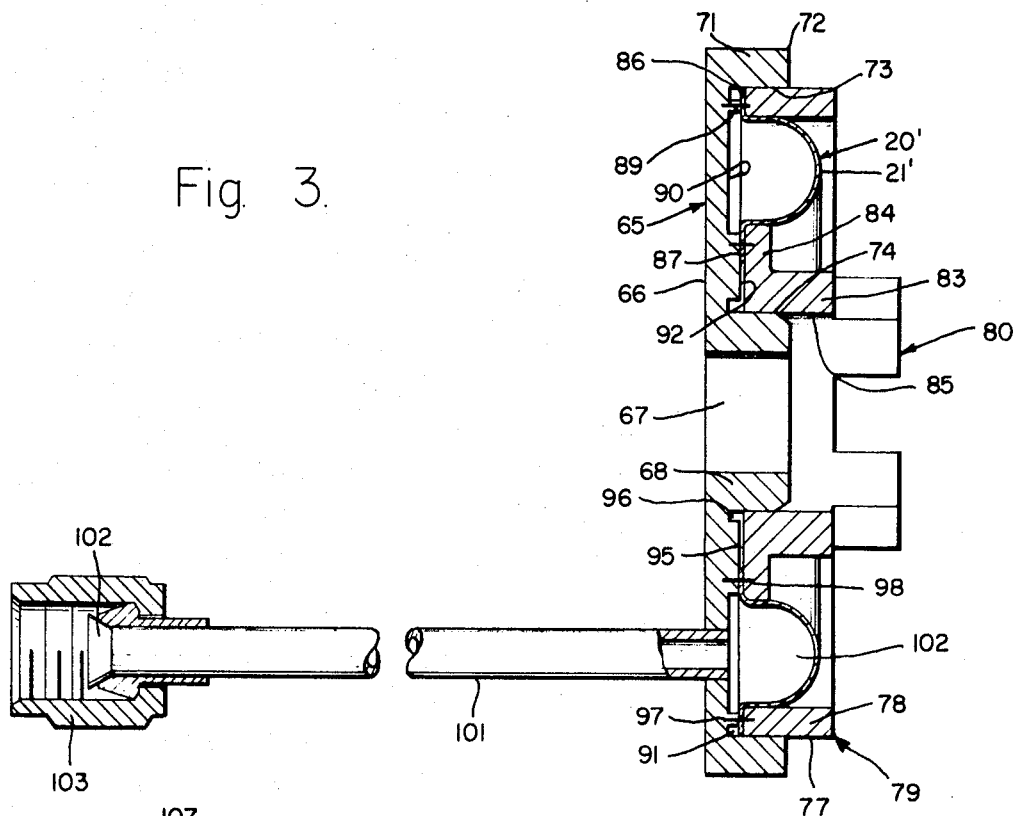
FIG. 3 is a cross-sectional view illustrating an intermediate stage in the present method of fabricating a modified device with relatively movable parts.

In FIG. 3, there is illustrated another embodiment of the invention. Here, three parts are used to make two relatively axially movable parts having a semitoroidal seal 20' therebetween. The tooling part 65 is disc-shaped, having a flat top 66 and having a centrally positioned cylindrical opening 67 extending therethrough. The cylindrical opening is formed in a wall 68 which is an axially directed flange with respect to the flat top 66. At the outer edge of the disc, there is an axially directed flange or wall 71 having a cylindrical surface 72. The wall 71 has an internal cylindrical surface 73 and the wall 68 has a cylindrical surface 74 outwardly of the opening 67. The cylindrical surfaces 73 and 74 form aligning or tooling surfaces for the positioning of the seal.

Inwardly of the wall 71 and in fitted engagement with the cylindrical surface 73 is a cylindrical surface 77 of a wall 78 of a ring 79. Radially outwardly of the wall 68 of the tooling member is a sleeve 80 having an axially directed wall 83 and extending outwardly therefrom is a radially directed flange 84.

The wall 83 has an inner cylindrical surface 85 which is in fitted engagement with the cylindrical surface 74 of the wall 68.

The radial distance between the outer edge of the flange 84 and the inner surface of the wall 78 is equal to the diameter of the toroidal portion 21 so that the seal fits properly within the two and so that the seal flanges 86 and 87 are respectively in abutment with the top edge of the wall 78 and the top surface of the wall 84. The top surface of the flange 86 is in abutment with an annular tip 89 extending downwardly from an inner surface 90 of the member 65. The tip is formed by cutting an annular groove 91 between the tip 89 and the cylindrical surface 73.

The top surface of the flange 87 is in abutment with a surface 92 of the member 65 and radially inwardly of the flange 87 is a space 95 between the inner surface 92 and the top surface of the flange 84. Inwardly of the space 95 is another annular groove 96 cut into the surface 92 and formed along the cylindrical surface 74.

The member 65, at the tip 89, is electron beam welded to the flange 86 and to the wall 78 of the ring 79 to provide a sealed area along the annular weld indicated at 97. The member 65 is welded to the flange 87 and to the flange 84 in the same manner as indicated at 98 to form an inner annular sealing ring along the seal flange.

For testing the seal, there is provided a tube 101 extending through and secured in the member 65 so as to be in communication with the surface 90 and the sealed area 102 formed by the welds and the semitoroid seal 20. An outer end 102 of the tube 102 is flared and has a threaded fitting 103 thereon for engagement with a pressure source.

Figure 4:
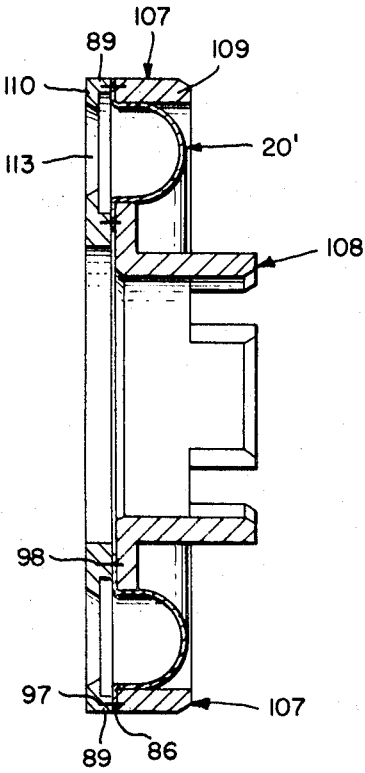
FIG. 4 is the cross-sectional view of a completed device made from the structure shown in FIG. 3.

The structure shown in FIG. 4 has been machined as shown after the seal has been tested. An outer ring member, generally indicated as 107, is secured to an inner sleeve member, generally designated as 108, by the diaphragm seal 20' which permits relative axial movement between the two members. The outer member is comprised of a portion 109 of the ring 78 in FIG 3, and a portion 110 of the tooling member 65. The portion 110 was formed by off the entire annular wall 71 from the member 65, and, in addition, machining part of the top 66 so that only the tip 89 remains, the latter being welded at 97 to the sealed flange 86 and the wall 109.

The members 107, 108 were severed to be independent by cutting an annular opening 113 into the top 66 of member 65, the opening being in substantial alignment with the semitoroidal configuration of the seal. In addition, the top face 66 in FIG. 3 was machined to have a substantially thinner wall as shown in FIG. 4. The aligning wall 68 in FIG. 3 has also been completely removed outwardly of the groove 96 and partially removed outwardly of the space 95. Thus, when the walls 71 and 68 were removed, the aligning or tooling members no longer existed in the structure and when the annular opening 113 was made, the testing tube 101 was also removed.

What is claimed is:

1. The method of fabricating a device having two coaxial relatively axially movable parts joined by an intervening annular flexure which comprises the steps of:

positioning an annular flexible diaphragm having radially inner and outer annular flanges between two coaxial members having concentric annular radially inner and outer axially presented surfaces of substantially the same diameters as said flanges with said member surfaces contacting opposite sides of said diaphragm flanges;

joining said diaphragm flanges to their respective contacting member surfaces; and severing each member into two totally separate portions along an annular parting line between the joined flanges and surfaces to provide a finished device wherein the severed portions of said members and said diaphragm constitute said parts and flexure of the device.

2. The method of claim 1 wherein:

said joining step comprises fusing the contacting diaphragm flanges and member surfaces; and said method comprises the additional step of applying an axial clamping force to said members to firmly clamp said diaphragm flanges between said member surfaces during said joining and severing steps and then removing said clamping force.

3. The method of claim 2 wherein:

said joining step comprises welding said diaphragm flanges and member surfaces to one another.

4. The method of claim 3 wherein:

said welding step comprises electron beam welding said flanges and surfaces.

5. The method of claim 1 wherein:

members have annular cross sections concentric with their surfaces and concentric slidably interfitting portions for retaining said members in coaxial relation during said joining and severing steps; and said method comprises the further step of removing one of said interfitting portions following said severing step, whereby said parts of the finished device are supported for relative axial movement solely by said diaphragm.

6. The method of claim 3 wherein:

said diaphragm comprises a semitoroidal diaphragm having a generally semitoroidal wall portion between and joining said flanges.

7. The method of claim 3 wherein:

said diaphragm is impervious to fluid to provide a fluid seal between said members.

* * * * *